United States Patent [19]

Achar et al.

[11] Patent Number: 4,537,834

[45] Date of Patent: Aug. 27, 1985

[54] METAL (II) 4,4',4",4'''-PHTHALOCYANINE TETRAAMINES AS CURING AGENTS FOR EPOXY RESINS

[75] Inventors: Bappalige N. Achar, Mysore, India; George M. Fohlen, Millbrae; John A. Parker, Los Altos, both of Calif.

[73] Assignee: The United States of America as represented by the Administrator of the National Aeronautics and Space Administration, Washington, D.C.

[21] Appl. No.: 598,777

[22] Filed: Apr. 11, 1984

Related U.S. Application Data

[63] Continuation-in-part of Ser. No. 440,656, Nov. 10, 1982, Pat. No. 4,499,260.

[51] Int. Cl.$^3$ ............................................. G08G 59/50
[52] U.S. Cl. ........................................ 428/413; 428/260; 428/408; 525/107; 525/113; 525/119; 525/186; 528/94; 528/113; 528/117; 528/407
[58] Field of Search ................. 528/117, 113, 94, 407; 525/107, 113, 119, 186; 428/413, 408, 260

[56] References Cited

U.S. PATENT DOCUMENTS

| | | | |
|---|---|---|---|
| 3,301,814 | 1/1967 | Parry | 528/117 |
| 4,140,658 | 2/1979 | Seltzer | 528/118 |
| 4,246,394 | 1/1981 | Schulde et al. | 528/117 |
| 4,335,228 | 6/1982 | Beitchman et al. | 528/45 |
| 4,350,804 | 9/1982 | Ostrowski et al. | 528/117 |
| 4,358,571 | 11/1982 | Kaufman et al. | 528/117 |

OTHER PUBLICATIONS

Heat Resistant Adhesive Based on Phthalocyanine Copolymers, Parry, TD Report ADS-TDR-63-356, 4/63.

*Primary Examiner*—Lester L. Lee
*Attorney, Agent, or Firm*—Darrell G. Brekke; John R. Manning; Robert D. Marchant

[57] ABSTRACT

Metal, preferably divalent copper, cobalt or nickel, phthalocyanine tetraamines are used as curing agents for epoxides. The resulting copolymers have high thermal and chemical resistance and are homogeneous. They are useful as binders for laminates, e.g. graphite cloth laminate.

12 Claims, No Drawings

METAL (II) 4,4',4'',4'''-PHTHALOCYANINE TETRAAMINES AS CURING AGENTS FOR EPOXY RESINS

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 U.S.C. 2457).

This application is a continuation-in-part of our copending application Ser. No. 440,656, filed Nov. 10, 1982 now U.S. Pat. No. 4,499,260.

FIELD OF THE INVENTION

The invention relates to heat resistant polymers derived from metal (II) 4,4',4'',4'''-phthalocyanine tetraamines by polymerizing them with epoxy compounds.

BACKGROUND OF THE INVENTION

The broad interest in epoxy resins originated from their excellent adhesion to a variety of materials, shelf-life stability of the uncatalyzed liquid resin alone, and electrical and physical properties of the cured laminates. Depending upon the structure of the curing agent and curing conditions, it is possible to obtain toughness, chemical resistance and mechanical properties ranging from extreme flexibility to high strength hardness, high adhesive strength, good heat resistance and high electrical insulation. The art of utilizing high-strength fibers with good adhesive properties of epoxy resins in producing superior composite materials is well known. The known uses of the efficient high strength-to-weight ratio are in the air frame industry, for marine vessels, and other transportation industries, for electrical insulation, chemical processing tanks and building construction. Epoxy-fabric or fiber laminates have been used in many stages of the fabrication of aircraft because of their simplicity of fabrication, light weight, low cost and low radar echo. For many purposes, graphite cloth has been gaining favor over fiberglass cloth for composite use because of its lighter weight and high tensile and elastic modulus values. In recent years, with increasing concern for human survivability against fire hazards, many polymeric materials such as polyimides, modified phenolics, bismaleimides and including many epoxy resin systems were studied as matrix resins. The dynamic thermogravimetric analyses and the limiting oxygen index were the two main experimental techniques used to evaluate the flammability properties of these materials. Based on these studies, the epoxy based resins are rated as poor in respect to their thermal stability and flammability. In general, polymers with high anaerobic char yields are expected to show high limiting oxygen index (LOI) and low flammability. The incorporation of the highly aromatic structure of the metal phthalocyanines into polymers is known to increase thermal stability and the chemical resistance. The use of the phthalocyanine carboxylic acids and copper phthalocyanine to cure epoxy resins has been described in U.S. Pat. No. 3,301,814 (Jan. 31, 1967) and shown to incorporate good thermal stability and good adhesion to stainless steel at high temperature. However, those phthalocyanine derivatives and copper phthalocyanine are insoluble, react heterogeneously and remained as discrete particles even after curing. Because of this major disadvantage of insolubility, complete realization of their thermal stability and chemical resistance of the phthalocyanines were not seen in the cured resins.

In our copending application, Ser. No. 440,656 polymers of metal (II) 4,4',4'',4'''-phthalocyanine tetraamines with various dianhydrides are described.

OBJECTS OF THE INVENTION

It is an object of the present invention to provide improved epoxy polymers by curing them with metal (II) 4,4',4'',4'''-phthalocyanine tetraamines.

It is a particular object of the invention to provide copolymers of epoxides and phthalocyanine tetraamines which possess the high thermal and oxidative resistance of phthalocyanines and which are homogeneous in their composition.

BRIEF SUMMARY OF THE INVENTION

In accordance with the present invention a metal (II) 4,4',4'',4'''-phthalocyanine tetraamine is used as a curing agent for an epoxy material. The reaction may be represented as follows:

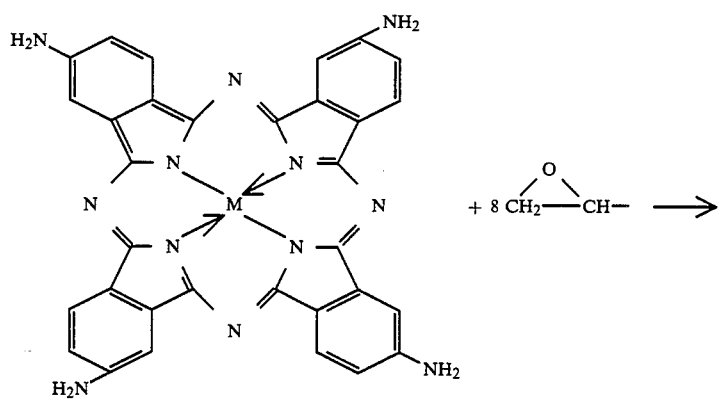

-continued

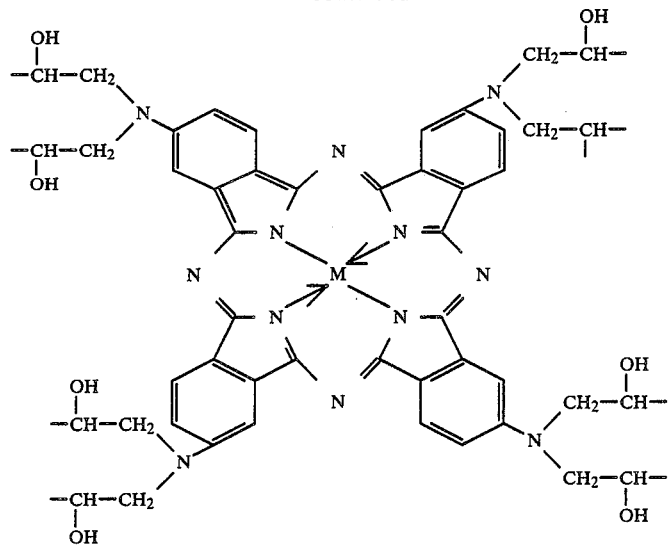

M = Cu, Co, Ni, ...

Most epoxy materials may be cured in this manner. In general, epoxy materials generally used for purposes such as the production of laminates are used. The metal M is preferably a divalent metal such as divalent Cu, Co or Ni having an atomic radius close to 1.35 Å but other metals may be used. Copper, cobalt and nickel are preferred because their phthalocyanine tetraamine compounds and resulting polymers are more stable chemically and thermally. Suitable solvents are aprotic solvents such as dimethylsulfoxide (DMSO), dimethylacetamide (DMA) and dimethylformamide (DMF). A suitable catalyst is boron trifluoride in the form of its monoethylamine complex ($BF_3.MEA$), After initial reaction and removal of solvent curing is effected at an elevated temperature.

DETAILED DESCRIPTION OF THE INVENTION

Preparation of metal (II) 4,4′,4″,4‴-phthalocyanine tetraamines may be carried out as described in copending application Ser. No. 440,656. Thus a 4,4′,4″,4‴-tetra nitrophthalocyanine is first prepared and the nitro groups are reduced to amino groups.

Study of the curing reaction using the commercially available epoxy resins DEN-438, Epi-Rez SU-8, DER-542, Epon 825, MY-720 and the like with the metal phthalocyanine tetraamines showed that curing required relatively high temperatures and long times. This in itself is undesirable and these conditions were found to degrade epoxy resins to some extent, resulting in degraded properties in the cured epoxy resins. However, with the addition of a small quantity of 0.5–1.0 phr of boron trifluoridemonoethylamine curing took place at lower temperature and at a faster rate. Infrared spectra, thermogravimetric analyses and differential calorimetric analyses studies were used to establish the optimum curing conditions. A curing schedule of 4 hours of heating at 180° C. and then post-curing at 250° C. for 1 hour was found to give optimum properties in the cured materials. The thermal stability of the cured resin increased with increased concentration of the metal phthalocyanine tetraamine. The optimum concentration of the metal phthalocyanine tetraamines is the stoichiometric amount or slightly less of metal phthalocyanine, i.e., two epoxy groups per amino group of the metal phthalocyanine tetraamine.

It is well known that the addition of small amounts of various kinds of elastomers can improve the fracture toughness, impact strength and overcome the brittle failure of many types of polymers. In many cases, in fact, most commonly, the elastomers used have a large aliphatic hydrocarbon component, and can contribute to the flammability of an already somewhat flammable resin. With the curing agents of this invention, the flammabilities of the epoxy resins are so greatly reduced that the addition of these elastomers in the amounts herein specified does not render them at all flammable. The effect of addition of 2–20 phr of carboxy terminated butadieneacrylonitrile (CTBN) and amine terminated butadiene-acrylonitrile (ATBN) on the properties of the epoxy cured with metal phthalocyanine tetraamines has been studied. Improved mechanical properties are observed by the addition of either CTBN or ATBN. The optimum concentrations of CTBN or ATBN are 3 to 5 phr. The mechanical properties of the epoxy resin cured with the metal phthalocyanine tetraamines, alone and with added CTBN or ATBN were evaluated on laminates prepared from the resin and woven graphite cloth.

The following specific examples will illustrate the practice and advantages of the invention. In these examples and elsewhere, the following abbreviations have the following meanings:

PTA means 4,4′,4″,4‴-phthalocyanine tetraamine and when preceded by the symbol for a metal, as for example, Cu II it signifies the copper -phthalocyanine complex.

DEN-438 means the epoxy resin derived from epichlorohydrin and a phenol-formaldehyde novolak. It is a product of Dow Chemical Company.

Epi-Rez Su-8 means the epoxy resin derived from epichlorohydrin and a bisphenol A-formaldehyde novolak. It is a product of CIBA-Geigy.

DER-542 means the epoxy resin derived from epichlorohydrin and tetrabromobisphenol A. It is a product of Dow Chemical Company.

EPON 825 means the epoxy resin derived from epichlorohydrin and bisphenol A also known as the diglycidyl ether of bisphenol A. It is a product of Shell Chemical Company.

MY-720 means the epoxy resin derived from epichlorohydrin and diaminodiphenyl methane, also known as the tetraglycidyl amine of diaminodiphenyl methane. It is a product of CIBA-Geigy.

CTBN means carboxy terminated butadiene-acrylonitrile.

ATBN means amine terminated butadiene-acrylonitrile.

phr means parts per hundred of resin.

EXAMPLE 1

Curing of DEN-438 with CuPTA 4 g of CuPTA was dissolved in a minimum volume of dimethylsulfoxide (or dimethylacetamide or dimethylformamide). To the clear solution 10 g of DEN-438 epoxy resin and 100 mg of boron trifluoride-monoethylamine complex were added followed by stirring the mixture to obtain a uniform concentration. The solvent was removed at 75°–80° C. in an air-draft oven. Then the material was cured at 180° C. for 4 hr followed by post curing at 250° C. for 1 hr.

A chemically resistant, thermally stable and tough material was obtained.

EXAMPLES 2 and 3

The above procedure was also done using CoPTA and NiPTA instead of CuPTA. Similar kinds of polymeric material were obtained.

EXAMPLE 4

4 g of CuPTA was dissolved in a minimum volume of dimethylsulfoxide (or dimethyl acetamide or dimethyl formamide). To the clear solution of 10 g of DEN-438 epoxy resin, 0.3–0.5 g of CTBN or ATBN and 100 mg. of boron trifluoride-monoethylamine complex were added. The reaction mixture was vigorously stirred for uniform concentration. The solvent was removed at 75°–80° C. in an air-draft oven and cured as explained above to obtain tough material.

EXAMPLES 5 and 6

The foregoing procedure was repeated with CoPTA and NiPTA instead of CuPTA to obtain similar thermally stable tough materials.

EXAMPLE 7

Preparation of Laminates

Three- and nine-ply, 10×10-in. woven graphite cloth squares (an eight-harness, satin-weave cloth prepared from Celion 3000 fiber) were uniformly coated with a high-viscosity solution of 40–44 phr copper phthalocyanine tetraamine (CuPTA), 100 g DEN-438 epoxy resin, and 1 phr boron trifluoride monoethylamine (BF$_3$.MEA) complex in dimethylsulfoxide (or dimethyl acetamide or dimethylformamide). The same solution with 3 to 5 phr of the CTBN elastomer, was also used. Most of the solvent was removed from the graphite cloth in an air-draft oven at 75° C. The dried prepreg cloths were then stacked (nine or three plies) between metal sheets covered with aluminum foil and Teflon film release sheets. The entire arrangement was placed inside a vacuum bag prepared from Vac-pak film and vacuum vag sealant. A pressure of 100 psi was applied, using a flat platen press in vacuum at 100° C. for 1.5 h. The laminate was cured further at a pressure of 400 psi and a temperature of 180° C. for 4 h followed by the postcuring at 250° C. for 1 h under the same conditions.

The above laminating fabrication procedure was also used with cobalt phthalocyanine tetraamine (CoPTA) and nickel phthalocyanine tetraamine (NiPTA) instead of copper phthalocyanine tetraamine.

EXAMPLE 8

Testing and Test Results

Samples measuring 2.75×0.25 in. were cut from the nine-ply laminates and used in measuring the limiting oxygen index (LOI) according to the procedure of ASTM 2863.

Tensile strength was measured with a gauge length of 4.0 in., using an Instron instrument in accordance with the procedures of ASTM D638-68. A cross-head movement of 0.1 in./min was used. The sample breadth was 0.25 in. and depth was nearly 0.12 in.

The flexural tests of the laminates were determined by using a span-to-depth ratio of 32:1. Samples had a breadth of 0.5 in., and a cross-head speed of 0.1 in./min was used (ASTM D790-70).

Instron short-beam shear tests were performed on the 0.75×0.5-in. laminate samples, according to ASTM D2344-76. A span-to-depth ratio of 5:1 and a cross-head of 0.05 in./min were used.

The resin contents of the laminates were determined by boiling known weights of the laminates in concentrated nitric acid for about 1.5 h, cooling, diluting with about five volumes of water, filtering and washing the fibers with water, acetone, and alcohol until the filtrate was colorless. The fibers were dried at 100° C. to constant weights.

The moisture absorption was determined by placing several weighed test specimens in boiling, demineralized water for 2 h, wiping the surfaces, and weighing again. The specific gravity of the laminates was determined by the standard procedure.

10–15 mg samples were used for the thermogravimetric studies. The analytical results are given in Table I. The thermo-oxidative stabilities of the laminates, as judged from their temperatures of maximum rate loss in air (PDT$_{max}$) were found to be somewhat less than the PDT$_{max}$ of the corresponding neat resins. This may be due to a catalyzing action of the graphite fibers on the degradation process of the resin system in an oxidizing atmosphere. However, thermal stability of the cured resin system in nitrogen was found to be unaffected by the presence of the graphite cloth. Initial degradation was observed at a temperature of 380° C., although the weight loss was very small; there was no catastrophic decomposition in the nitrogen atmosphere. The resin systems were found to have the highest char yields of any cured epoxy so far tested.

The LOI values are also given in Table I. The addition of 3–5 phr CTBN to improve the mechanical properties of the laminates showed no major effect either on the thermal stabilities or on the LOI values. The experimental values, 48–50, clearly indicate a remarkable improvement in the fire-resistance of the epoxy resin systems cured with the metal phthalocyanine tetraamines over those using other curing agents. Such values have not heretofore been reported for any cured epoxy formulation.

The mechanical properties of laminates made from graphite cloth and the epoxy resin formulations are shown in Table II. Tensile, flexural, and short-beam shear strengths and dynamic modulus values are based on ambient temperature measurements. The addition of low-molecular-weight reactive liquid elastomers improved the mechanical properties of the cured resins. The nature, concentration, and solubility of the elastomers have remarkable influence on the thermal and mechanical properties of the resins. They form microparticles in the epoxy resin and it is this dual-phase formation, one of which is elastic, that increases the toughness of the thermosetting polymers. The elastomer used in this study was a carboxy-terminated copolymer of butadiene and acrylonitrile (CTBN):

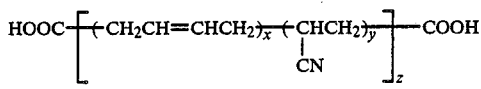

where $X=5$, $y=1$, and $z=10$ for a typical copolymer.

The evaluation of the mechanical properties was done on the laminates prepared from the epoxy resin cured with metal phthalocyanine tetraamines in the presence of CTBN. The concentration of CTBN was varied between 2-20 phr. The tensile, flexural, and short-beam shear strengths and dynamic modulus showed considerable improvements when 3-5 phr of CTBN was present in the cured epoxy resin systems. For example, DEN-438 epoxy resin cured using cobalt phthalocyanine tetraamine showed an increase in tensile strength from $60.28 \times 10^3$ to $68.52 \times 10^3$ psi, in flexural strength from $59.2 \times 10^3$ to $75.1 \times 10^3$ psi, in short-beam shear strength from $6.67 \times 10^6$ to $7.32 \times 10^6$; and in dynamic modulus of elasticity from $8.7 \times 10^5$ to $23.2 \times 10^5$ psi in the presence of 3-5 phr of CTBN.

Higher concentrations of CTBN caused deleterious effects, for they decreased the LOI values and thermal stability; lower concentrations of CTBN showed no substantial improvements in the mechanical properties. Samples of 0.94 in. long and 0.5 in. wide were cut from the two three plies [(CoPTA)+(D.E.N. 438)+(BF$_3$.MEA)/Graphite Cloth] and [(CoPTA)+(D.E.N. 438)+(BF$_3$.MEA)+(CTBN)/Graphite Cloth] laminates for dynamic mechanical analyses; the samples were about 0.05 in. thick. The modulus values remained nearly constant up to a temperature of 130° C., dropped gradually up to 200° C., and then changed slightly beyond that temperature. In the presence of CTBN, the modulus values remained constant to 140° C., changed gradually up to 300° C., and then varied slightly above that temperature. In both cases, the modulus decreased about one-third from the original values over the temperature range of 130°-300° C. The tan δ values, which define the ratio of the dissipation energy and the storage energy, increased with temperature, reached maximum values at the glass-transition temperatures, and then decreased. The glass-transition temperature increased from 187° C. to 239° C. in the presence of CTBN elastomer.

A scanning electron micrograph of the epoxy cured with copper phthalocyanine tetraamine showed uniform morphology which indicates that metal phthalocyanine tetraamines cure the epoxy resin through a chemical reaction and enter the epoxy resin matrix in a homogeneous way.

TABLE I

Dynamic Thermogravimetric and LOI Analytical Data

| Materials | Air PDT | Air PDT$_{max}$ | Nitrogen PDT | Nitrogen PDT$_{max}$ | Char yield, % (800° C.) | LOI |
|---|---|---|---|---|---|---|
| Graphite cloth | 640 | 740 | 700 | 820 | 97.6 | — |
| D.E.N. 438 + CuPTA + BF$_3$.MEA, neat | 375 | 612 | 370 | 430 | 74 | — |
| [D.E.N. 438 + CuPTA + BF$_3$.MEA/ graphite cloth] laminate | 432 | 555 | 355 | 440 | 87.5 | 50.3 |
| [D.E.N. 438 + CuPTA + BF$_3$.MEA + CTBN/ graphite cloth] laminate | 430 | 550 | 353 | 442 | 87.0 | 48.5 |
| [D.E.N. 438 + CoPTA + BF$_3$.MEA/ graphite cloth] laminate | 430 | 560 | 352 | 442 | 86.0 | 50.1 |
| [D.E.N. 438 + CoPTA + BF$_3$.MEA + CTBN/ graphite cloth] laminate | 430 | 562 | 350 | 440 | 86.0 | 48.1 |
| [D.E.N. 438 + NiPTA + BF$_3$.MEA/ graphite cloth] laminate | 431 | 558 | 350 | 445 | 86.5 | 50.1 |
| [D.E.N. 438 + NiPTA + BF$_3$.MEA + CTBN/ graphite cloth] laminate | 430 | 556 | 350 | 440 | 86.0 | 48.3 |

TABLE II

Physical Properties of Graphite Cloth-Reinforced Laminates

| Materials | Specific gravity | Resin content, % | Moisture absorption % | Tensile strength, MN/m$^2$ ($\times 10^3$ psi) | Flexural strength MN/m$^2$ ($\times 10^3$ psi) | Short-beam shear strength GN/m$^2$ ($\times 10^6$ psi) | Dynamic modulus, GN/m$^2$ ($\times 10^5$ psi) |
|---|---|---|---|---|---|---|---|
| (1) D.E.N. 438 + CuPTA + BF$_3$.MEA | 1.46 | 34.6 | 1.51 | 402.39 (58,360) | 424.04 (61,500) | 475.76 (6,900) | — |
| (2) D.E.N. 438 + CuPTA + BF$_3$.MEA + CTBN | 1.47 | 35.2 | 1.65 | 482.44 (69,970) | 517.81 (75,100) | 490.23 (7,110) | — |
| (3) D.E.N. 438 + CoPTA + BF$_3$.MEA | 1.50 | 32.3 | 1.89 | 415.63 (60,280) | 408.18 (59,200) | 459.90 (6,670) | 5.999 (8,700) |
| (4) D.E.N. 438 + CoPTA + BF$_3$.MEA + CTBN | 1.51 | 38.2 | 1.82 | 472.45 (68,520) | 505.4 (73,300) | 504.71 (7,320) | 15.996 (23,200) |
| (5) D.E.N. 438 + NiPTA + BF$_3$.MEA | 1.46 | 35.8 | 1.88 | 400.53 (58,090) | 444.04 (64,400) | 484.03 (7,020) | — |
| (6) D.E.N. 438 + NiPTA + BF$_3$.MEA + CTBN | 1.49 | 39.2 | 1.90 | 456.45 | 513.68 | 539.19 | — |

TABLE II-continued
Physical Properties of Graphite Cloth-Reinforced Laminates

| Materials | Specific gravity | Resin content, % | Moisture absorption % | Tensile strength, MN/m$^2$ ($\times 10^3$ psi) | Flexural strength MN/m$^2$ ($\times 10^3$ psi) | Short-beam shear strength GN/m$^2$ ($\times 10^6$ psi) | Dynamic modulus, GN/m$^2$ ($\times 10^5$ psi) |
|---|---|---|---|---|---|---|---|
| | | | | (66,200) | (74,500) | (7,820) | |

We claim:

1. A homogeneous cured polymer of metal 4,4',4",4'''-phthalocyanine tetraamine and one or more epoxy compounds.

2. The homogeneous cured polymer of claim 1 wherein the metal is a divalent metal having an atomic radius of about 1.35 Å.

3. The homogeneous cured polymer of claim 2 wherein the metal is divalent copper, cobalt or nickel.

4. The homogeneous cured polymer of claim 2 wherein the metal is Cu II.

5. The homogeneous cured polymer of claim 2 wherein the metal is Co II.

6. The homogeneous cured polymer of claim 2 wherein the metal is Ni II.

7. A method of preparing a heat resistant homogeneous cured polymer which comprises curing an epoxide with a metal 4,4',4",4'''-phthalocyanine tetraamine, said metal 4,4',4",4'''-phthalocyanine tetraamine being a pure material having been produced by the process of reducing metal 4,4',4",4'''-tetranitro phthalocyanine.

8. The method of claim 7 wherein the metal is a divalent metal having an atomic radius of about 1.35 Å.

9. The method of claim 8 wherein the metal is copper, cobalt or nickel.

10. A laminate impregnated with the cured polymer of claim 1.

11. The laminate of claim 10 wherein the metal is Cu II, Co II or Ni II.

12. The laminate of claim 11 including an elastomer.

* * * * *